Jan. 25, 1966        H. AMREHN        3,231,740
PROTECTIVE DEVICE FOR GAMMA RAY SOURCE IN MEASURING APPARATUS
Filed July 3, 1962
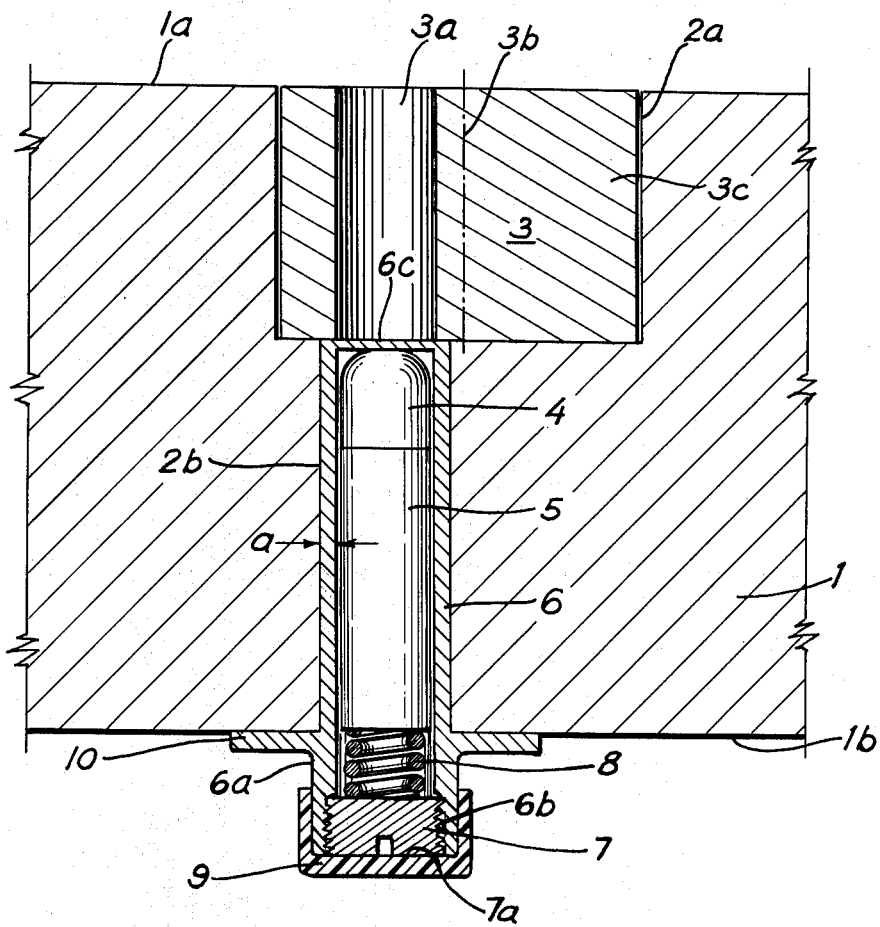
INVENTOR
*HERMANN AMREHN*
BY *Toulmin & Toulmin*
ATTORNEYS 3,231,740
PROTECTIVE DEVICE FOR GAMMA RAY SOURCE
IN MEASURING APPARATUS
Hermann Amrehn, Marl, Germany, assignor to Chemische Werke Hüls Aktiengesellschaft, Marl, Kreis Recklinghausen, Germany
Filed July 3, 1962, Ser. No. 207,308
Claims priority, application Germany, July 7, 1961, C 8,446
5 Claims. (Cl. 250—108)

The invention is related to a protective device for installation in a container in which material, usually a fluid, is subjected to radiation emanating from a radioactive substance.

In known apparatus for measuring the density of fluids, mostly liquids, radioactive material has been employed to utilize the radiation emanating therefrom, particles or gamma rays, and to subject the liquid under investigation to such radiation. Absorption of the radiation by the liquid is utilized to determine the density thereof. Since one uses high energy radiation, the source thereof has to be handled with such care not to endanger the personnel.

In known apparatus one uses a leading container for the measurement or at least a lead covering or shield for such container. The container has an inwardly open recess. The radioactive substance is housed in a capsule placed into the recess upon a carrier therein.

One in a while the capsule has to be checked for cracks with regard to any leakage. In case of cracks and in case the radioactive substance in the capsule is a salt of a radioactive metal, the moisture may enter the capsule through the cracks and dissolve the salt. Such solution may then leave the capsule and contaminate the environment.

In the known apparatus as described, the capsule itself has to be checked, and it has to be taken out of the recess of the lead container. The examining person will thereby directly be subjected to the radiation leaving the capsule. Furthermore, upon replacing the capsule into the recess again, one has to calibrate anew the apparatus, since the capsule will then have a different position as before, because it is impossible to place the capsule in exactly the same position as it had prior to the examination.

It is a primary object of the present invention to provide for a radioactive source placement in which the capsule does not have to be removed for checking its tightness, and in which the position of such capsule even after having been removed will be exactly the same as prior to the checking.

It is another object of the present invention to provide a new protective casing for a radioactive radiation source used in radioactive testing apparatus and to be placed into the protective shielding thereof.

According to one aspect of the present invention in a preferred embodiment thereof, it is suggested that a recess be provided in the protective shielding of a container, or in the container itself, communicating with the exterior as well as with the interior thereof. A metallic casing having but one opening is placed into the recess. This casing has a flange integral therewith and resting against the outer wall surface of the shielding or container. The casing has an outwardly protruding portion terminating at the single opening of the casing into which is screwed a stopper, and this stopper is covered by a plastic, moisture proofed cap. In the casing there is disposed a closed capsule containing the radioactive material and being seated on a carrier also housed inside the casing. A spring is interposed between the stopper and the carrier, so as to urge the carrier with capsule against a thin bottom of the capsule being located at the radiation "window" adjacent the interior of the shielding or the container.

While the specification concludes with claims particularly pointing out and distinctly claiming the subject matter which is regarded as the invention, it is believed that the invention, the objects of the invention and further objects and advantages thereof, will be better understood from the following description taken in connection with the accompanying drawing in which there is shown a cross-section through a lead wall of a container having a capsule placement arrangement according to the preferred embodiment of the invention.

In the figure of the drawing, there is illustrated a portion of wall of a container 1 having a wall surface 1a, and the space above constitutes the interior of the container while the space below this wall portion having wall surface 1b, is the exterior of container 1.

The specific configuration, shape, extension etc., of container 1 is not important for the invention and can be selected in accordance with the intended purpose. Container 1 can, for example, constitute a pipe for a fluid density measuring apparatus.

At the interior wall surface 1a of container 1, there is an annularly shaped recess 2a in which is housed in fitting relationship therewith, a corresponding lead window 3, rotatable in recess 2a. The gearing for causing rotation is not illustrated and is conventional; only the axis of rotation is referred to by 3b. Member 3 has a cylindrical bore 3a constituting the actual window. Member 3 is comprised predominantly of leaden portion 3c filling recess 2a.

Recess 2a communicates eccentrically with another cylindrical recess 2b of smaller diameter and penetrating the outer wall surface 1b of container 1 so as to communicate with the exterior region.

There is a metallic casing 6 preferably made of stainless steel. Casing 6 is disposed in recess 2b and is secured to container 1. Casing 6 is of tubular shape and its bottom portion 6c abuts window 3a when in the illustrated position (open window). When the window is open, its axis is coaxial with that of casing 6. Upon rotation of member 3, leaden portion 3c of member 3 is placed between tubular casing 6 and the interior space of container 1.

Casing 6 has an integral flange 10 resting against the outer wall surface 1b of container 1. There is an outwardly protruding stud portion 6a of casing 6 also integral with flange 10. Stud portion 6a has an inner threaded portion 6b into which is screwed a stopper 7.

Stopper 7 urges a spring 8 against a carrier 5. Both, spring 8 and carrier 5 are disposed in casing 6. Carrier 5 supports a closed capsule 4 made of steel and containing a radioactive substance. Spring 8 while urging carrier 5 also centers capsule 4 so that it assumes a definite and predetermined position with respect to container 1. Capsule 4 is urged towards and retained by the bottom 6c of casing 6.

Flange 10 also serves to define the position of capsule 4 with respect to container 1.

A plastic cover cap 9 fits snugly over protruding stud 6a as well as stopper 7 and prevents moisture from entering the interior of tube 6.

In case the capsule 4 is to be checked as to any cracks, one simply has to remove cover 9. Then the outer surface 7a is wiped over by a cleaning cloth, and the cloth then is tested for radioactivity.

This test is sufficient since the only path a watery solution of radioactive substance can travel is from capsule 4, along carrier 5, and then through the thread between stopper 7 and hollow stud 6a. The cap 9 is relatively tight at the outside of stud 6a and thus prevents further migration of the radioactive material so that there will appear a radioactive deposit on surface 7a of stopper 7. Since the appearance of such a deposit can be checked by the "cleaning-cloth-test" as described, no removal of capsule 4 is necessary to check it for cracks. This is an appreciable advantage over capsules mounted conventionally and which have to be removed for checking.

Another, actually even simpler mode of checking for cracks in capsule 4 is so that the inner surface of cap 9 for radioactivity since any depositing on surface 7a of stopper 7 naturally will be accompanied by a depositing or radioactive material upon this inner surface of cap 9.

Preferably, a new cap 9 is placed upon stud 6a after every test.

Cap 9 performs an additional function in that it prevents radioactive material having travelled through the thread from being washed off from surface 7a.

Casing 6 with its integral portions 10 and 6a is made of a corrosion proof material, preferably of stainless steel. In order to avoid piping at welding seams, casing 6 is preferably made on a lathe from a cylindrical or prism metal piece. The wall thickness a—a in FIG. 1 of the inner part of casing 6 is about 1 mm.; stud 6a is somewhat thicker while the wall thickness of bottom portion 6c is somewhat smaller. The inner diameter of casing 6 of course, depends on the size of the capsule 4.

The length of casing 6 is defined very accurately by, and results from the length of capsule 4 plus the length of carrier 5, plus the length of tensioned spring 8 and an additional amount of about 5 mm. which should be provided for the threaded portion 6b receiving stopper 7. Preferably, stopper 7 is screwed in so far that its surface 7a registers with the end face of stud 6a of casing 6. The total length of casing 6 has to be at least so large that outside of cover cap 9 the radiation doses do not exceed 0.7 millirontgen per hour.

The invention is not limited to the embodiments described above but all changes and modifications thereof not constituting departures from the spirit and scope of the inventions are intended to be covered by the following claims:

I claim:

1. In a container for objects to be subjected to radioactive radiation, the combination comprising: means defining a recess in the wall of said container, said recess communicating with the interior of said container as well as with the exterior thereof; said recess having a cylindrical portion adjacent the exterior wall surface of said container; a cylindrical metallic casing fitted into said recess having one end closed and having a flange portion adjacent the other end resting against said outer wall surface of said container adjacent said recess, said casing further having an outwardly protruding portion; a closed capsule containing a radioactive substance disposed in said casing; a carrier enclosing said capsule in said casing; a spring engaging said carrier on the opposite side from said capsule; a stop member removably secured in said casing in said outwardly protruding portion thereof, and urging said spring against said carrier for holding it against said closed end; and a plastic cover over said stop member and said outwardly protruding casing-portion.

2. A protective casing for insertion into a radioactive shielding and for housing a radioactive substance, comprising: a cylindrically shaped hollow element being open on one end only; means defining an outer flange at said element adjacent said open end; an inner threaded portion in said element; a threaded stopper for insertion into said element at said threaded portion of said element; a plastic, moisture-proof cap fitted about said threaded portion of said element and said stopper; a carrier enclosing a capsule in said element; and a spring interposed between said stopper and said carrier.

3. A protective device for insertion into a shielding pertaining to an apparatus using nuclear radiation, comprising: a hollow cylinder made of seamless, stainless steel, having an integral outer flange, and an inner threaded portion on one end which is open while said cylinder is closed on the other end; a stopper screwable into said threaded portion for closing said open end of said cylinder; a plastic cap positioned on the open end of said cylinder; a closed steel capsule in said cylinder containing radioactive material; and a carrier and spring arrangement for placing and centering said capsule into said cylinder, with said spring engaging said stopper and urging said capsule against the closed end of said cylinder.

4. In a container for objects to be subjected to radioactive radiation, the combination comprising: means defining a first cylindrical recess in the wall of said container; means defining a second, cylindrically shaped recess of smaller diameter in the wall of said container, said second recess communicating with the exterior of said container as well as eccentrically with said first recess, said first recess communicating with the second recess; a lead member with a bore in said first recess, said bore being alignable with said second recess; a cylindrical metallic casing closed at its inner end fitted into said second recess, having a flange portion resting against said outer wall surface adjacent said recess, said casing further having an outwardly protruding portion; a closed capsule containing a radioactive substance disposed in said casing; a carrier for said capsule in said casing; a spring engaging said carrier on the opposite side of said capsule; a stop member removably secured in said casing in said outwardly protruding portion thereof, and urging said spring against said carrier for centering; and a plastic cover over said stop member and said outwardly protruding casing portion.

5. In a container for objects to be subjected to radioactive radiation, the combination comprising: means defining a first cylindrical shaped recess in the wall of said container, a second cylindrical shaped recess of smaller diameter, extending from the bottom of the first recess, eccentrically thereof to and through the opposite wall of said container, a lead member with a bore in said first recess, said bore being alignable with said second recess, a cylindrical metallic casing having its inner end closed, fitted into said second recess, said casing also having a flange adjacent its open end resting against said opposite wall surface, said casing further having an outwardly protruding portion beyond said flange; a closed capsule containing a radioactive substance disposed in said casing; a carrier enclosing said capsule in said casing; a stopper member removably secured in the protruding portion of said casing, a spring in said casing between said stopper and carrier for urging said carrier against the closed end of said casing and a plastic cap fitted over the protruding end of said casing.

References Cited by the Examiner
UNITED STATES PATENTS

| | | | |
|---|---|---|---|
| 2,772,361 | 11/1956 | Hiestand | 250—106 |
| 2,870,341 | 1/1959 | Pennock | 250—106 |
| 2,891,168 | 6/1959 | Goertz et al. | 250—106 |

FOREIGN PATENTS

| | | |
|---|---|---|
| 712,000 | 7/1954 | Great Britain. |

RALPH G. NILSON, *Primary Examiner.*

ARCHIE BORCHELT, *Examiner.*